Patented May 5, 1942

2,282,124

UNITED STATES PATENT OFFICE 2,282,124

PRODUCTION OF IRON FROM IRON OXIDE

Frank A. Fahrenwald, Chicago, Ill.; Marjorie P. Fahrenwald, executrix of said Frank A. Fahrenwald, deceased No Drawing. Application March 8, 1941, Serial No. 382,336

3 Claims. (Cl. 75—34)

My invention relates to the production of sponge iron of high purity.

It is possible to produce sponge iron of a degree of purity previously unattainable by reducing iron oxide at temperatures of from about 1400° F. to about 1900° F. And in such reduction any antimony, arsenic, phosphorus, selenium, sulphur, and tellurium are successfully eliminated. However, the removal of substantial amounts of phosphorus or sulphur would introduce an additional problem in disposal of the hydrides of these elements.

On the other hand, hydrogen reduction will not eliminate certain other impurities, particularly silica, if any is present, and most commercial ores available in this country contain enough silica to interfere with getting a product of the degree of purity contemplated herein.

After extensive investigation, it appeared that commercial mill scale seemed to satisfy the requirements, at least so far as chemical analysis was concerned, it contains either no phosphorus and sulphur, or such small amounts that hydrogen reduction can produce satisfactory results, so far as these impurities are concerned. And the silica content also is very small and in a state of substantially molecular subdivision because it has resulted from oxidation of silicon in solid solution in the original steel.

In the operation of steel mills throughout the country, during many processing steps, oxide accumulates on the surface of metal undergoing treatment and subsequently scales or flakes off, either of its own accord or as a result of the processing operations to which the piece of metal is being subjected. In this way a substantial tonnage accumulates regularly of iron oxide in powdered form, which is the product referred to herein as commercial mill scale. This material can be shipped and handled as a powder but from nearly all sources of supply it is in a lamellar condition. And it contains materially less oxygen than corresponds to the chemical formula $Fe_2O_3$. Since it is appreciably magnetic, there is a substantial percentage of the magnetic oxide $Fe_3O_4$. Oxidation of $Fe_3O_4$ to $Fe_2O_3$ would add 3½% to the weight of the ore. Since oxidation usually adds from 5% to 7% to the actual weight, a portion of the material is evidently in a lower state of oxidation than $Fe_3O_4$, such as $FeO$.

Repeated attempts to produce a satisfactory and dependable grade of sponge iron from mill scale by reducing it without fusion by high temperature contact with reducing gases including hydrogen, were unsuccessful. The product was of poor quality and contained material and variable amounts of unreduced iron oxide, so that no uniformity of quality could be maintained in a continuous process. Also, the time necessary to complete the reduction was excessive.

I have discovered that by first oxidizing such mill scale to increase its oxygen content, preferably until it is substantially completely oxidized to $Fe_2O_3$, a powder is obtained which will react in quiescent masses with hot reducing gases containing substantial percentages of hydrogen much more rapidly than the untreated mill scale, and with substantially complete uniformity so that good control of the quality of the product can be maintained.

According to the invention the mill scale is placed in any suitable rotary kiln or rabbling furnace of the prior art and heated to a high temperature in the presence of excess oxygen and in the absence of any amounts of reducing materials sufficient to impede the oxidation of the ore. The weight increase varies a little with different sources of supply but is usually between 5% and 7%.

And the treated material is then exposed at temperatures of from 1400° to 1900° F., to the action of reducing gases of similar temperature, including substantial percentages of hydrogen. In this way, I have secured a high quality and a perfectly uniform product.

Without further elaboration the foregoing will so fully explain my invention that others may by applying knowledge current at the time of application, readily adapt the same for use under various conditions of service.

I claim:

1. The method of manufacturing sponge iron from mill scale which comprises heating the mill scale at high temperatures and agitating the heated mill scale in contact with air, to increase its oxidation to the maximum corresponding to the chemical formula $Fe_2O_3$; and subsequently deoxidizing the fully oxidized material by high temperature contact with hot hydrogen; the iron oxide being kept in a quiescent condition during such reduction.

2. The method of manufacturing sponge iron from mill scale which comprises heating the mill scale at high temperatures and agitating the heated mill scale in contact with oxidizing gases, to increase its oxidation enough to render it non-magnetic; and subsequently deoxidizing the oxidized material by high temperature contact with hot reducing gases containing hydrogen; the iron oxide being kept in a quiescent condition during such reduction.

3. The method of manufacturing sponge iron from mill scale which comprises heating the mill scale at high temperatures in contact with oxidizing gases, to increase its oxidation enough to render it substantially non-magnetic; and subsequently deoxidizing the oxidized material by high temperature contact with hot reducing gases containing hydrogen.

FRANK A. FAHRENWALD.